C. T. WESTLAKE.
BRAKE RIGGING.
APPLICATION FILED MAR. 4, 1918.
1,282,507.
Patented Oct. 22, 1918.
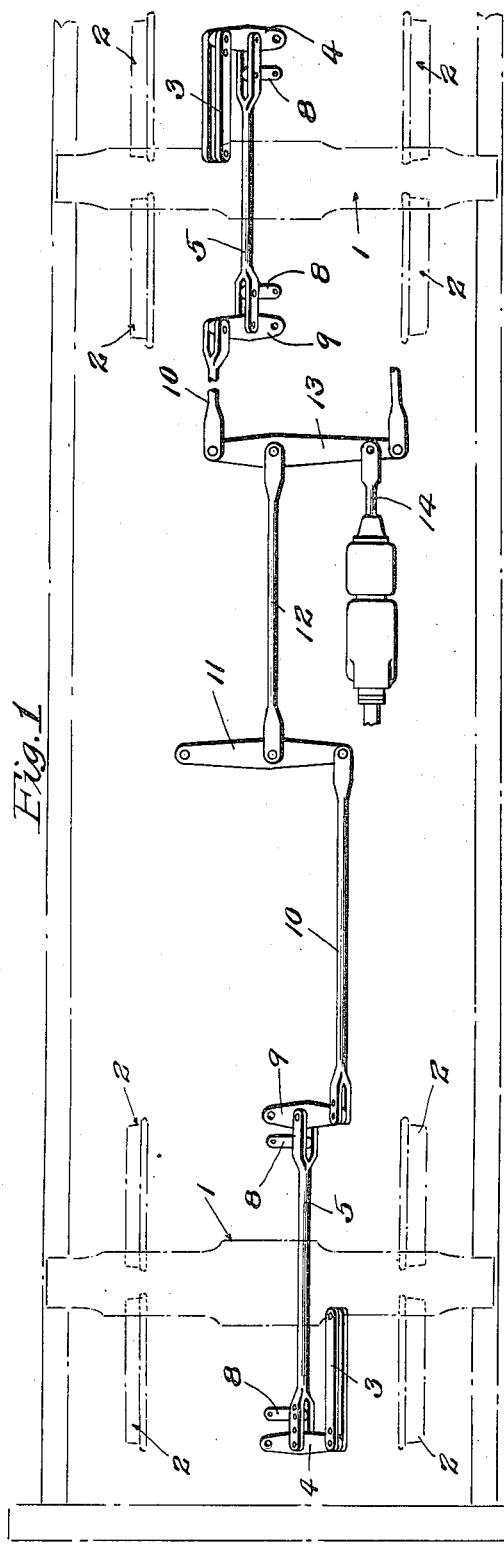
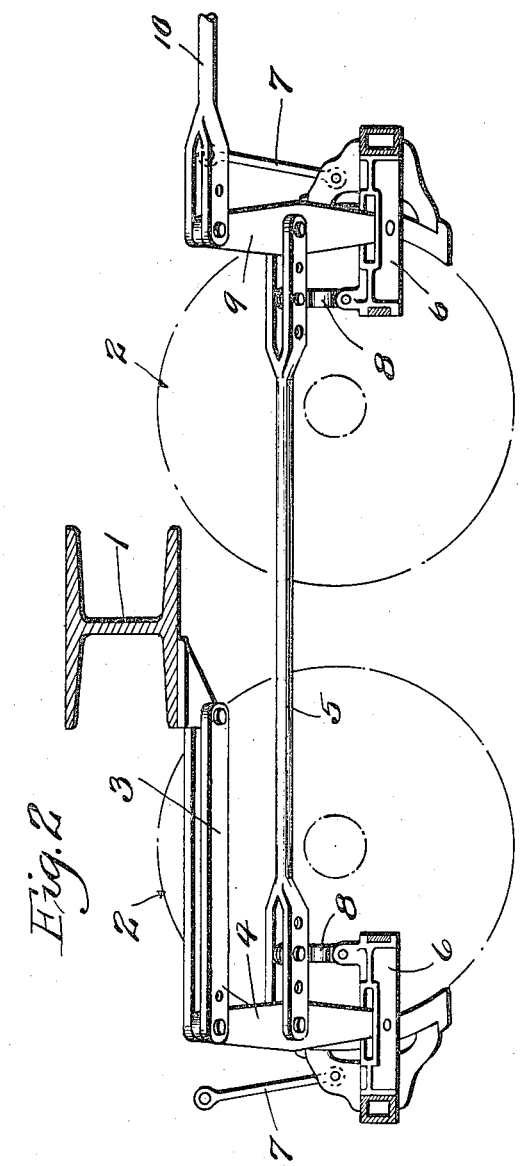
Inventor
Charles T. Westlake

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

BRAKE-RIGGING.

1,282,507.  Specification of Letters Patent.  Patented Oct. 22, 1918.

Application filed March 4, 1918. Serial No. 220,205.

*To all whom it may concern:*

Be it known that I, CHARLES T. WESTLAKE, a citizen of the United States, residing at St. Louis, Missouri, have invented a certain new and useful Improvement in Brake-Rigging, of which the following is a full, clear, and exact description, such as will enable others skilled in the art to which it appertains to make and use the same, reference being had to the accompanying drawings, forming part of this specification.

Figure 1 is a partial plan view of a railway car illustrating my improved brake rigging.

Fig. 2 is a partial sectional view through a truck illustrating my improved brake rigging.

This invention relates to a new and useful improvement in brake rigging for railway cars, the object being to simplify the construction of devices of this character and to so arrange the same that repairs to brake beams or the renewal of brake shoes can be readily made.

In the drawings 1 indicates the body bolsters of the car, 2 the car wheels. To the body bolster is secured a bracket to which is connected a dead lever bar, or bars, 3. To the free end of this dead lever bar is secured the brake lever 4 to which is attached a connecting rod 5. The lower end of the brake lever rod 4 is connected to the strut 6 of an ordinary brake beam whose head is suspended by hangers 7. The connecting rod 5 is preferably provided with an elongated eye whereby the inner end of the strut brake beam may be suspended therefrom by means of a link 8 which link may be flexible or inflexible as desired. The connecting rod 5 coöperates with a brake lever 9 to which is connected a pull rod 10. The pull rod is connected at its opposite end to a lever 11 pivotally mounted on the underframing of the car which lever is connected by a link 12 to the floating lever 13 to which is attached the piston rod 14 of the air cylinder. The system of leverage herein illustrated is not broadly new, the principal difference or novelty residing in the arrangement of the brake levers or brake beams with the connecting rod attached to the middle of the brake levers and the flexible or non-flexible links 8 supported by said connecting rod and in turn supporting the inner ends of the brake levers.

I claim:

1. In a brake rigging, the combination of brake beams supported at their ends by brake hangers, brake levers for operating said brake beams, said brake levers being connected at their lower ends respectively to the brake beams, a connecting rod for connecting said brake levers, and links connecting said brake beams and said connecting rod between the brake levers.

2. In a brake rigging, the combination of brake beams supported at their ends by brake hangers, brake levers for operating said brake beams, said brake levers being connected at their lower ends respectively to the brake beams, a connecting rod for connecting said brake levers, and links connecting said brake beams and said connecting rod between the brake levers, all of said above mentioned parts being pivotally connected together.

In testimony whereof I hereunto affix my signature this 27th day of February, 1918.

CHARLES T. WESTLAKE.